2 Sheets—Sheet 1.

H. ILLOWAY, I. KITSEE & P. A. KECK.
Stock Car.

No. 241,220.  Patented May 10, 1881.

2 Sheets—Sheet 2.

H. ILLOWAY, I. KITSEE & P. A. KECK.
Stock Car.

No. 241,220.   Patented May 10, 1881.

Attest
Danl Kelly
John Wright

Inventors
Henry Illoway
Isidor Kitsee
Peter A. Keck
By Geo J Murry Atty

N. PETERS, Photo-Lithographer, Washington, D. C.

UNITED STATES PATENT OFFICE.

HENRY ILLOWAY, ISIDOR KITSEE, AND PETER A. KECK, OF CINCINNATI, OHIO, ASSIGNORS TO THE PARLOR CATTLE CAR COMPANY, OF SAME PLACE.

STOCK-CAR.

SPECIFICATION forming part of Letters Patent No. 241,220, dated May 10, 1881.

Application filed January 12, 1880.

*To all whom it may concern:*

Be it known that we, HENRY ILLOWAY, ISIDOR KITSEE, and PETER A. KECK, of Cincinnati, Ohio, have invented certain new and useful Improvements in Stock-Cars, of which the following is a specification.

Our invention relates to improvements in railway-cars for transporting animals.

The objects of our improvements are, first, to provide separate stalls for each animal, which stalls are arranged to utilize, as near as possible, all the available space consistent with the health and comfort of the animals, and to facilitate their loading and unloading; second, to construct the partitions or sides of the stalls of a yielding character; third, to provide a means to supply the animals with food.

All of our improvements will be fully understood from a description of the accompanying drawings, in which—

Figure 1:
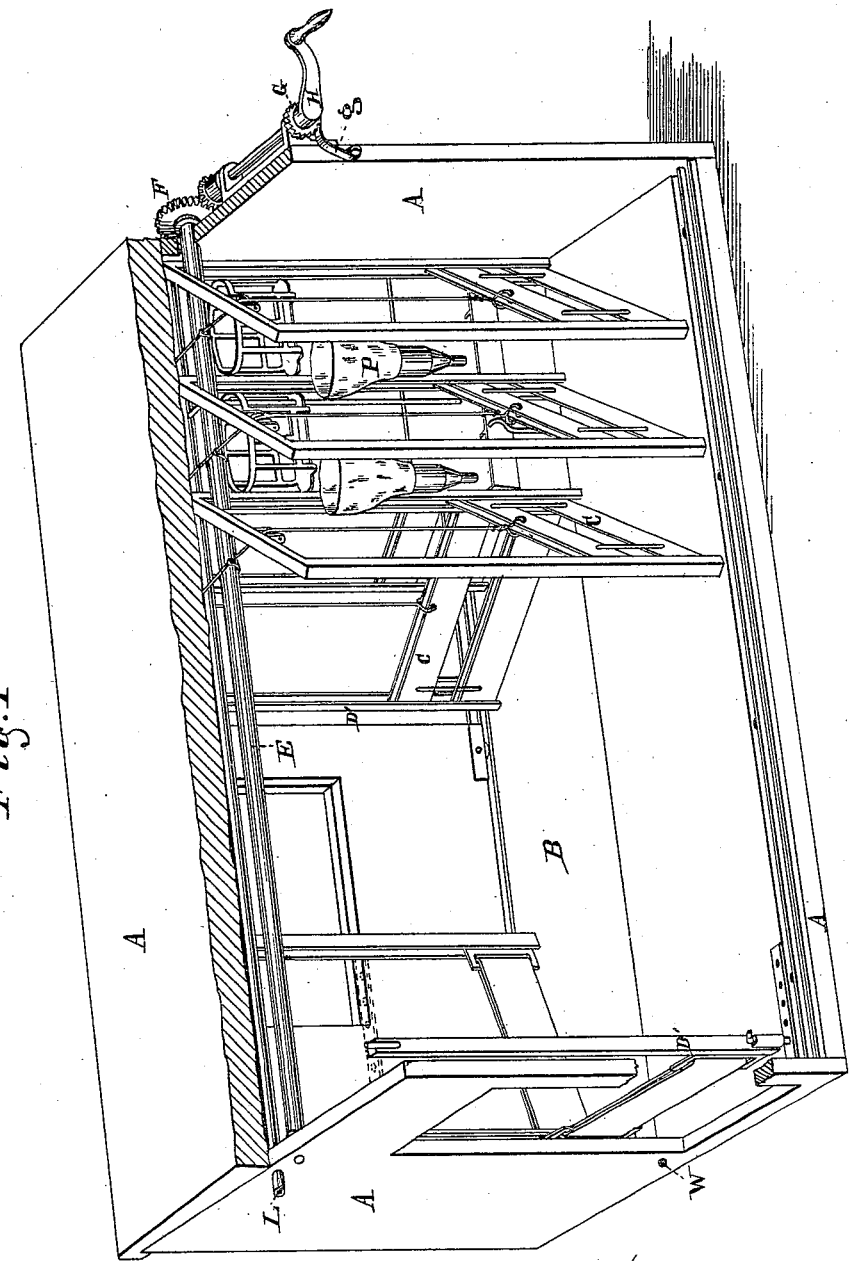
Figure 2:
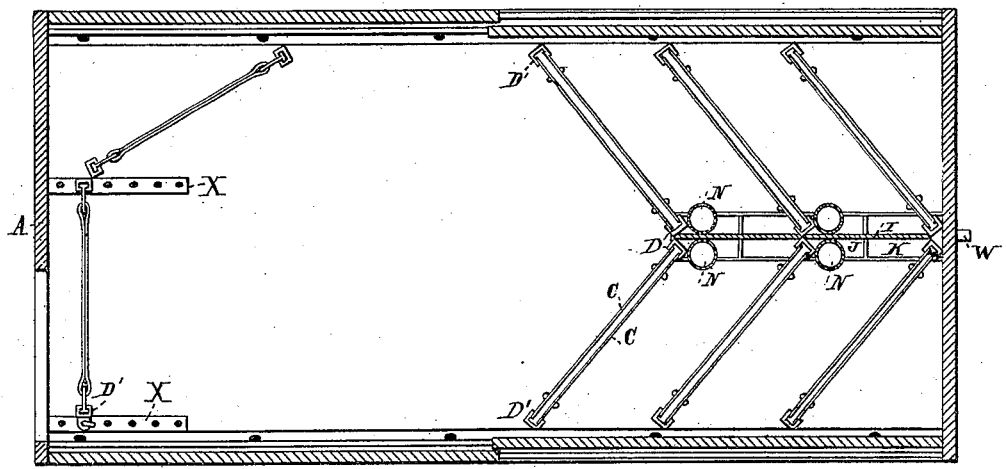
Figures 3, 4:
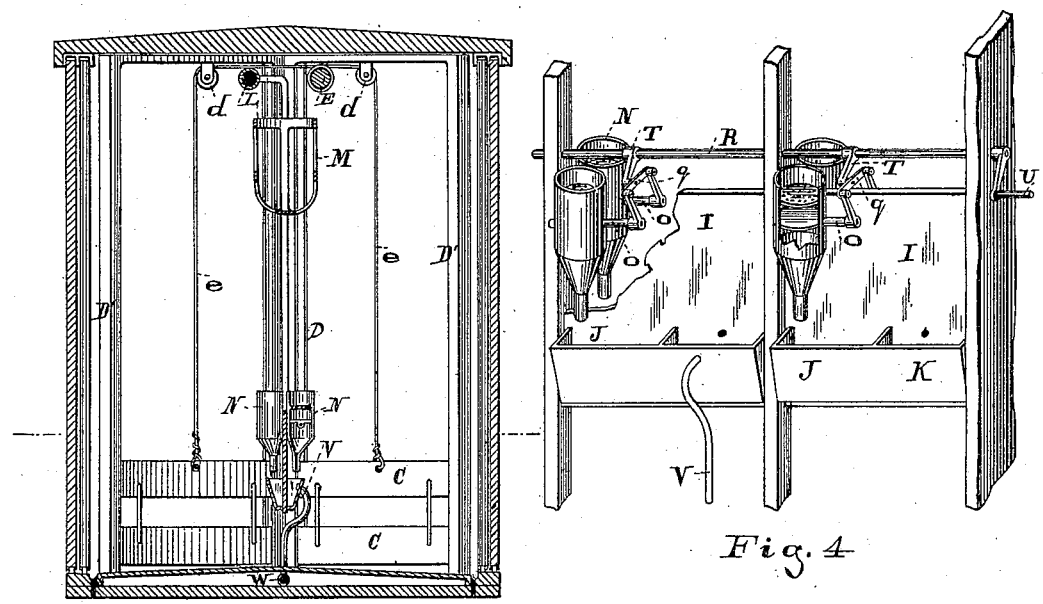

Figure 1 is a perspective view of a car embodying our improvements. The doors upon one side and a part of the top and one end are removed to more clearly show our improvements. Fig. 2 is a horizontal section taken on line $x$ $x$ of Fig. 3, which figure is a central transverse vertical section; and Fig. 4 is a perspective view, illustrating our arrangements for feeding and watering the animals.

Similar letters refer to similar parts throughout the various views.

A represents the frame of the car; B, the sliding doors forming its sides. The stalls, as clearly shown in Figs. 1 and 2, are arranged upon each side of the car and at an angle to its sides, so as to obtain sufficient space to accommodate two animals in the width of the car. The sides of the stalls are formed of steel straps C, framed together and adapted to slide vertically in the grooved upright stiles D D'. The steel straps are framed together near the ends and bowed out from each end toward the center.

E is a shaft passing longitudinally through the car, near the roof, and having its bearings in the opposite ends. One end passes to the outside of the car, and is provided with a gear-wheel, F, which meshes into another gear-wheel, that is secured to a shaft mounted in suitable bearings upon the end of the car. The purpose of this arrangement is to elevate the sides of the stalls simultaneously by means of cords $e$, secured to the sides C, and, after passing over pulleys $a$, are wound around shaft E by turning the crank H.

Upon the crank-shaft is a ratchet, G, which is engaged by a pawl, $g$, to hold the sides of the stalls up until the pawl is released from the teeth of the ratchet.

Between the opposite stalls is a dividing-board, I, to which the feed and water troughs J K are secured. The water-troughs K are simultaneously supplied with water by means of the pipe L and down-pipes leading from it to the several troughs K. The pipe L extends centrally through the car and projects out through the ends. The outer ends of the pipe may be provided with any suitable coupling, so that, if desired, the pipes through the entire train may be united, and the water-troughs all supplied from the tank on the locomotive, or from the station-tanks, as desired.

Between the center stiles, and near the top of the car, hay-racks M are secured. These should be large enough to hold sufficient hay for the intended journey.

The arrangement for feeding grain will now be described.

A metal hopper, N, is firmly secured to the center stiles, D, and board I, above the feed-trough J. Near the neck or upper part of this hopper is a perforated disk or bottom, and below it, in the cylindrical part of the hopper, is another bottom, which is secured upon a shaft that passes through the cylinder. The space between the grated bottom, which is rigidly secured within the hopper, and the lower bottom, which is turned by the shaft O, upon which it is secured, is just sufficient for one ration or "feed" of grain above the hopper N; and secured to its top is a bag, P. This is to be supplied with grain to last for the intended journey. The shafts O are provided with crank-arms, which project up above the dividing-board I, and the arms of the opposite hoppers are united by a link, $q$.

R is a shaft passing centrally through the car between the feed-holders. This shaft has secured upon it cranks T, the pins of which enter the links $q$, so that by turning the shaft R by a crank or key, U, outside of the car, the grain, which has by the motion of the car passed through the grating and filled the spaces in the hoppers N, between the gratings and the tilting bottoms, will be emptied into the feed-troughs J.

The bottom of the car is inclined from the center toward each side, and upon each side is a gutter with vertical openings passing from it through the bottom of the car, so that the floor of the car will always be dry and the animals have thus a more sure footing. The water-troughs have overflow-pipes V, which pass down and connect with a pipe, W, below the inclined bottom.

Near one end of the car (see Figs. 1 and 2) is shown a provision by which the sides of the stalls may be set at varying distances apart, so as to accommodate larger or smaller animals. The perforated plates X are secured to the top and bottom of the car, and the uprights D' are provided with bolts at their lower ends and steady-pins at top, or vice versa. By this means the stalls may be adjusted to any size desired. A rack-bar and pawl may also be used, instead of the bolt, to hold the movable stiles D' in position.

It is contemplated to cover the spring sides of the stalls with heavy canvas or other similar material, so that the animals will not be bruised or injured by the sudden stopping or starting of the train.

It will be seen that by our improved car comfortable quarters are provided for stock during transportation, that they may be fed and watered at the usual times without delay and without the necessity of entering the car for that purpose. The animals will consequently be kept quiet and arrive at their destination in a healthy condition and at full weight.

With our improved car it is entirely practicable to load or unload the animals singly, and hence they may be picked up at way-stations or discharged as readily as other freight.

We claim—

1. In combination with a stock-car, a series of stalls arranged diagonally upon each side of the car, the sides of said stalls being adapted to slide vertically between their upright supporting-stiles, and to be elevated and lowered simultaneously from the outside of the car, substantially as described.

2. The stall sides composed of spring-straps framed together at the ends and bowed out in the center, substantially as before set forth.

3. A car provided with a series of stalls arranged upon each side and opposite each other, with the hay-racks M supported between the central upright stiles, substantially as specified.

4. In a stock-car provided with a series of stalls, the combination, substantially as described, of hoppers N, fitted with an upper grated bottom and a lower tilting bottom, and reservoir P, said tilting bottom being actuated by shaft O, its crank-arm, link q, and shaft R, cranks T and M, said parts combined to operate for the purpose set forth.

5. The combination, substantially as before set forth, of the reservoirs, a series of measuring-hoppers constructed with grated tops and closed by valves, and a means for simultaneously operating all said valves from the exterior of the car.

6. The combination, substantially as before set forth, of the reservoir and the automatic measuring-hopper, constructed with a grated top and closed by a valve.

HENRY ILLOWAY.
ISIDOR KITSEE.
PETER A. KECK.

Witnesses:
GEO. J. MURRAY,
M. W. OLIVER.